US00RE36691E

United States Patent [19]

Pinsen

[11] E Patent Number: Re. 36,691

[45] Reissued Date of Patent: May 16, 2000

[54] FOOTBALL HELMET AND SHOULDER PAD COMBINATION

[76] Inventor: David Pinsen, 246 Cambridge Ave., Englewood, N.J. 07631

[21] Appl. No.: 08/861,099

[22] Filed: May 21, 1997

Related U.S. Patent Documents

Reissue of:

[64] Patent No.: 5,444,870
Issued: Aug. 29, 1995
Appl. No.: 08/192,374
Filed: Feb. 7, 1994

[51] Int. Cl.[7] ..... A41D 13/00; A42B 3/00

[52] U.S. Cl. ..... 2/468; 2/411; 2/422; 2/425

[58] Field of Search ..... 2/410, 411, 421, 2/422, 424, 425, 44, 45, 455, 459, 461, 468

[56] References Cited

U.S. PATENT DOCUMENTS

| | | | |
|---|---|---|---|
| 3,134,106 | 5/1964 | Shaffer et al. | 2/2 |
| 3,514,784 | 6/1970 | McDavid | 2/2 |
| 3,978,525 | 9/1976 | Bothwell | 2/424 |
| 3,991,421 | 11/1976 | Stratten | 2/2 |
| 4,825,476 | 5/1989 | Andrews | 2/421 |
| 5,261,125 | 11/1993 | Cartwright et al. | 2/421 |

FOREIGN PATENT DOCUMENTS

| | | | |
|---|---|---|---|
| 477718 | 1/1976 | U.S.S.R. | 2/410 |
| 1727780 | 4/1992 | U.S.S.R. | 2/421 |

*Primary Examiner*—Michael A. Neas

[57] ABSTRACT

A football helmet and shoulder pad combination are designed to prevent head and neck injuries. An outer helmet is connected to a neck assembly which permits but limits head turning mobility as well as up-down and left and right head tilt. The neck mechanism which is mounted about the neck comprises substantially circular inner and -outer spherical guides and a concentric movable inner element therebetween with an upwardly extending member on each side of the neck. The guides contain stops to limit the motion permitted by the helmet and the lower portion of the mechanism is mounted on the shoulder pads to distribute the load during impact. The helmet portion with a resilient coupling joining the portions. The upwardly extending members on the inner element are mounted to respective sides of the outer helmet. The helmet may also be retrofitted to existing equipment.

3 Claims, 4 Drawing Sheets

FOOTBALL HELMET AND SHOULDER PAD COMBINATION

Matter enclosed in heavy brackets [ ] appears in the original patent but forms no part of this reissue specification; matter printed in italics indicates the additions made by reissue.

BACKGROUND OF THE INVENTION

Unfortunately, there is the possibility of serious physical injury in sports such as football. Particularly serious are neck injuries which could be prevented by the present invention. The invention limits the movement in any direction of the head and neck during impact and thus prevents serious injuries. Abrupt and extended movements of the head are the cause of many injuries.

The prior art includes U.S. Pat. No. 4,279,038, which discloses a padded head protector for boxing. U.S. Pat. No. 3,148,375 to Jones discloses a football helmet which is designed to dissipate forces applied to a helmet in a rearward direction. U.S. Pat. No. 4,287,613 discloses a common widely used football helmet with sizing means and energy absorbing pads.

U.S. Pat. No. 5,123,408, discloses a flexible support brace which transfers excessive rearward motion of a football helmet through a flexible interlink brace which is mounted on the wearer's back.

Also of some interest are U.S. Pat. Nos. 4,233,689, 4,663,785 and 4,999,855. None of the prior art patents fully protect the wearer from abrupt movement of the head in any direction as disclosed in the present invention which involves a unique helmet design.

SUMMARY OF THE INVENTION

This invention relates to a protective head gear and in particular to the new and improved football helmet which limits the movement of the head in any direction. The helmet comprises an outer helmet portion and an inner helmet portion positioned over the wearer's head with springs separating and joining the inner and outer portions. A neck assembly comprises [a circular] *an* inner guide*, being substantially a hollow spherical section in shape,* and a concentric outer guide with a movable element therebetween, which are mounted about the wearer's neck. The outer guide includes a rotation stop which limits the rotation of the helmet in either direction, left or right, and a tilt stop which limits the up and down motion of the helmet. The movable inner element includes upwardly extending arms on each side which are mounted to opposite sides of the outer helmet portion. The lower portion of the guides engages the shoulder pads for purposes of energy absorption.

Accordingly, it is an object of this invention to provide a new and improved football helmet.

Another object of this invention is to provide a new and improved football helmet which limits the movement thereof with regard to the wearer to prevent head and neck injuries.

A more specific object of this invention is to provide a new and improved football helmet which includes a neck assembly coupled to a helmet portion to restrict movement in any direction to prevent injury.

A more specific object to this invention is to provide a new and improved helmet design which includes an outer helmet portion suspended from an inner helmet portion by resilient means and a neck assembly which is coupled to the helmet to limit the movement thereof and to the shoulder pads to distribute any impact.

BRIEF DESCRIPTION OF THE DRAWINGS

The above and other objects and advantages of the present invention may be more clearly seen when viewed in conjunction with the accompanying drawings wherein.

DETAILED DESCRIPTION OF THE INVENTION

Figure 1:
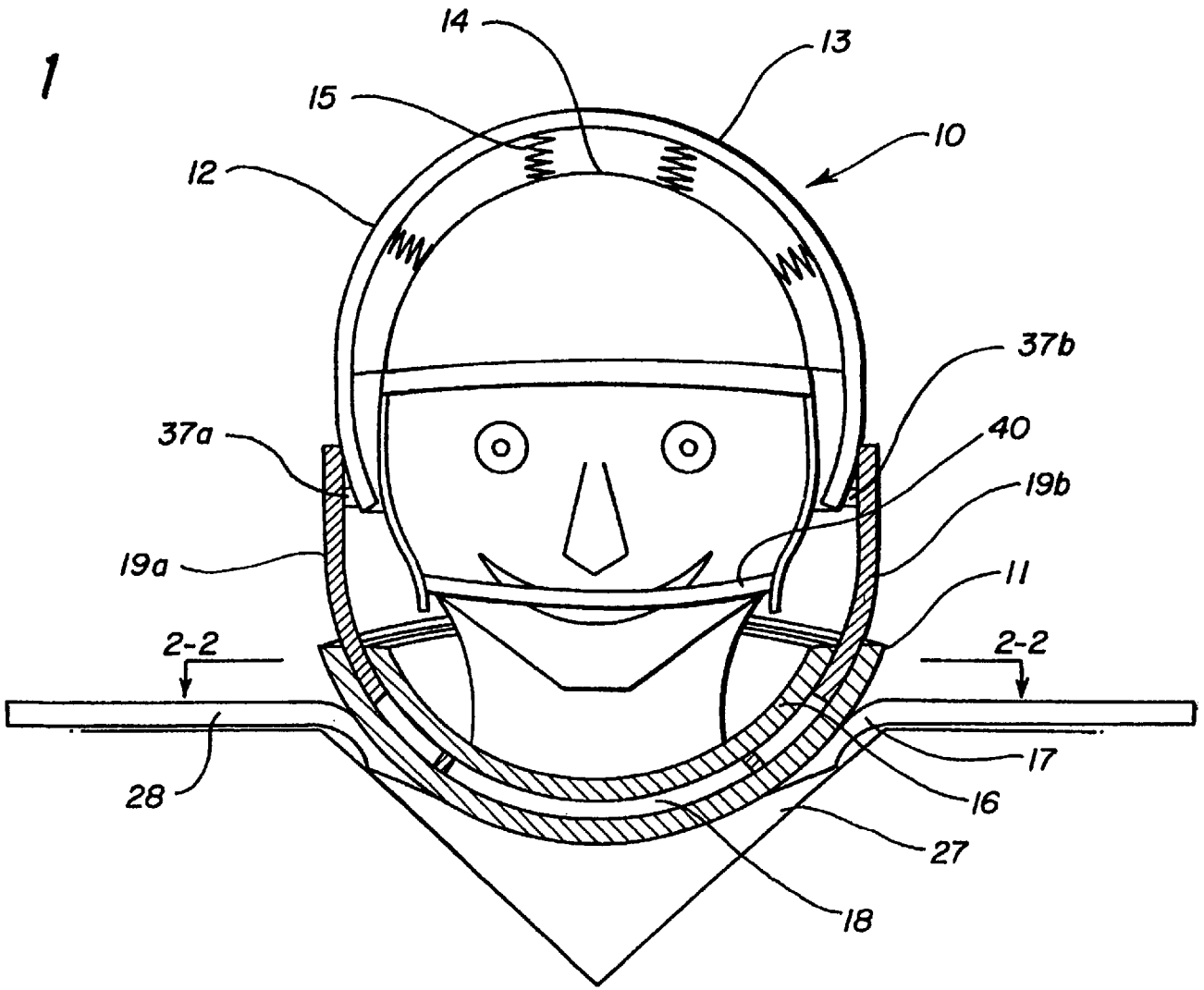
FIG. 1 is a front view of the invention with portions cutaway to illustrate the assembly thereof.
Figure 2:
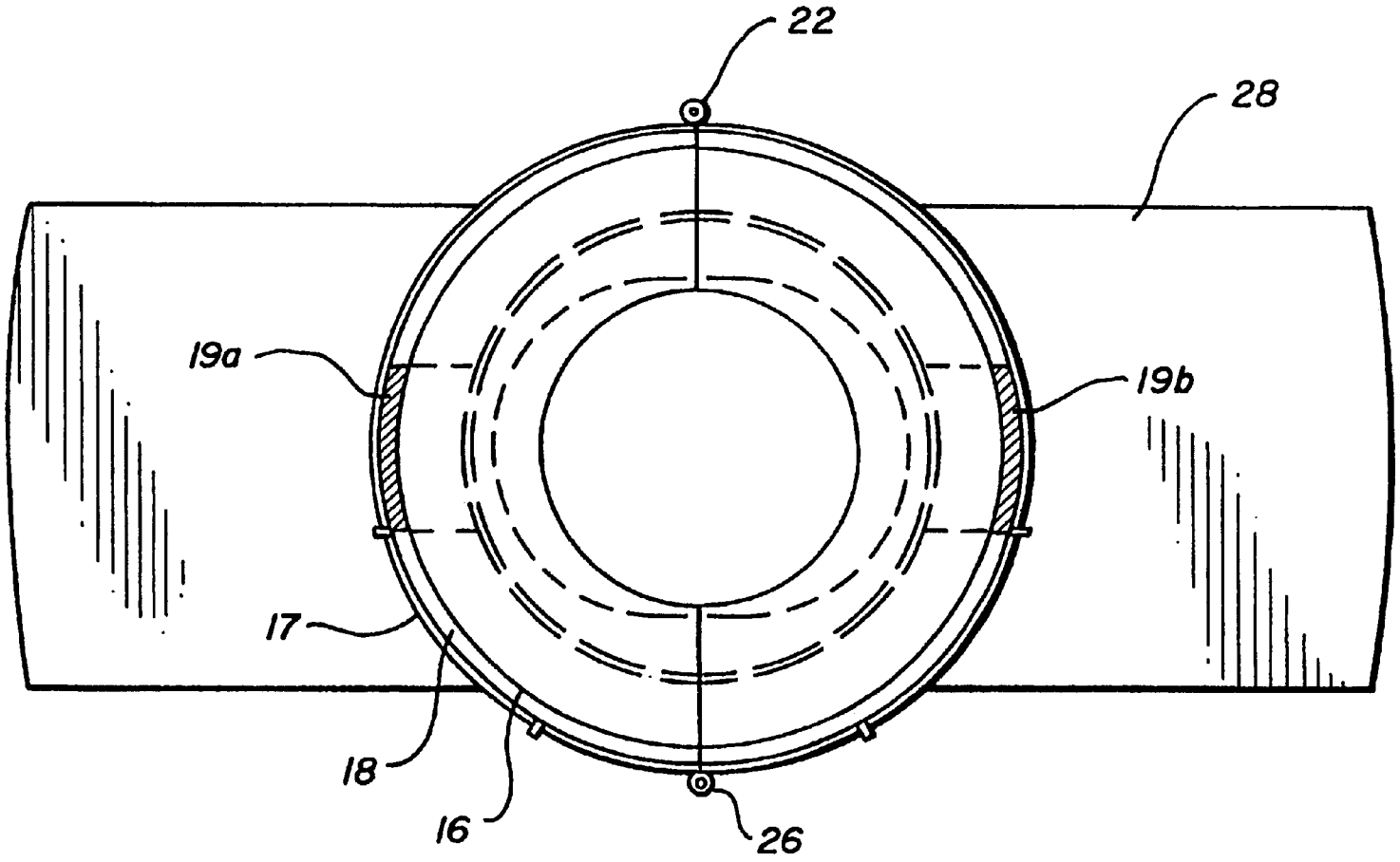
FIG. 2 is a cross sectional view of the invention taken along the line 2—2 of FIG. 1.

Referring now to the drawings, the helmet 10 of the present invention, which is designed to prevent sports injuries, comprises a neck assembly 11 and a helmet assembly 12. The helmet assembly 12 includes an outer portion 13 of a hard plastic material similar to present football helmets and an inner helmet portion 14 separated therefrom and joined by a plurality of springs 15 to cushion any impact.

Figure 3:
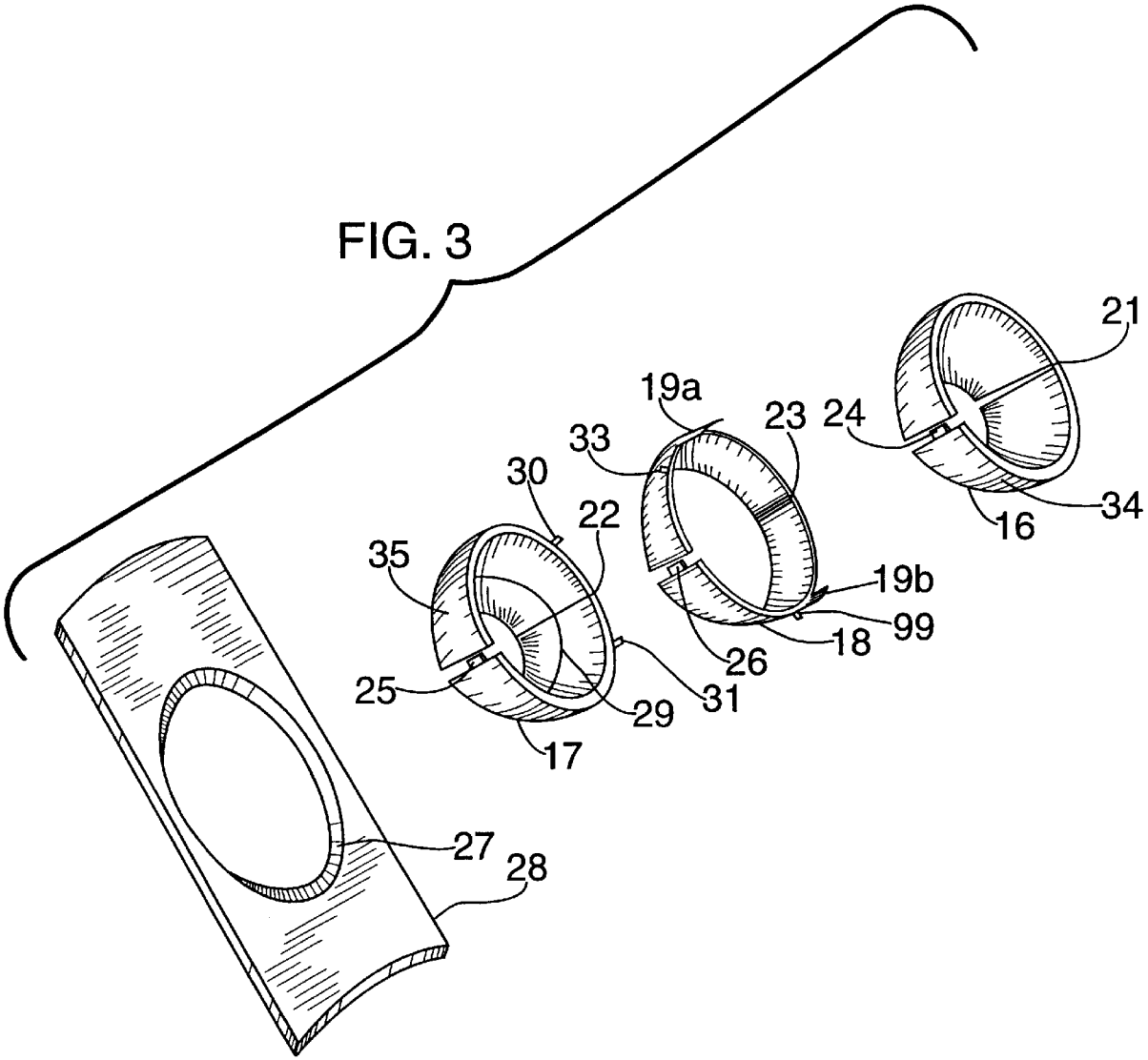
FIG. 3 is an exploded perspective view of the neck assembly part of the invention; and, FIG. 4 is a front view of the neck assembly with portions shown in phantom.
Figure 4:
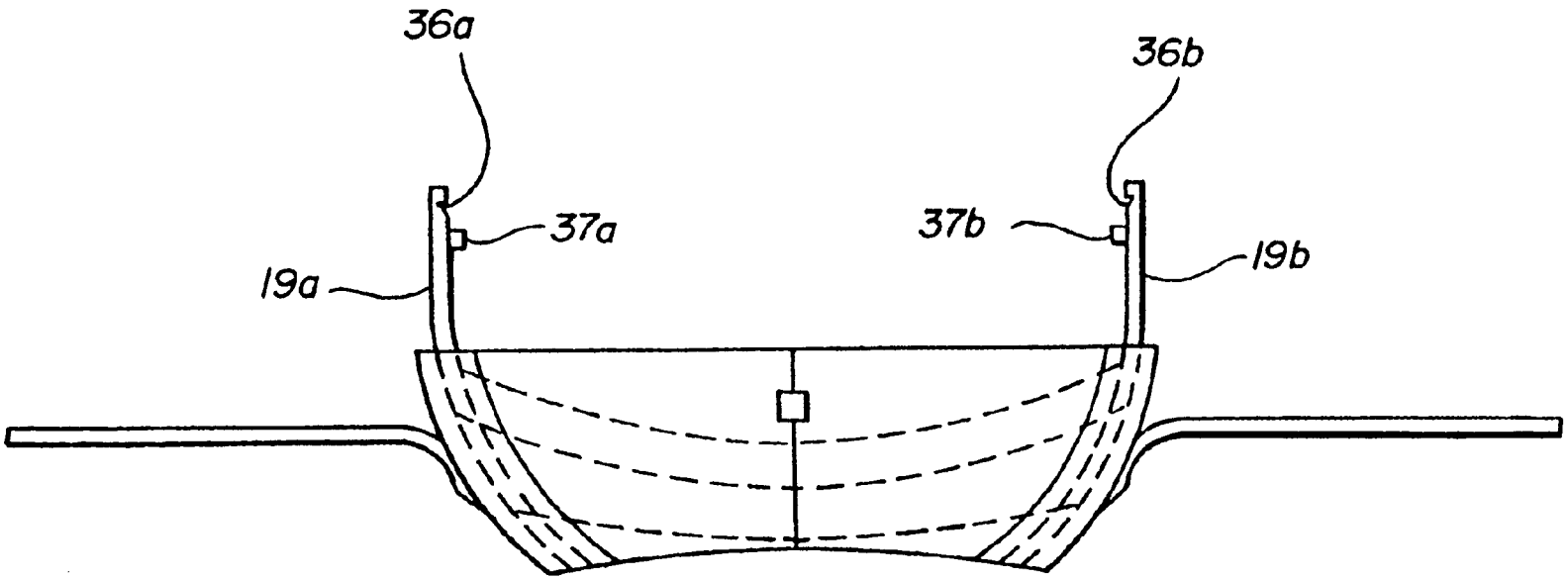

The neck assembly 11 comprises [substantially a hollow circular or cylindrical] *an* inner guide 16*, being substantially a hollow spherical section,* and a concentric outer guide 17. The guides 16, 17 each include a wall portion 34, 35 respectively see FIG. 3, which extends substantially the length of the neck. A movable member 18 having a pair of upwardly extending arms 19a or 19b is positioned between the guides 16 and 17. The neck assembly members 16, 17 and 18 each contain a hinge 21, 22, and 23 and a latch 24, 25 and 26 which opens to fit about the wearer's neck. The assembly 11 fits over the aperture 27 in the shoulder pads 28. A face guard 40 may also be provided.

The outer guide 17 includes a tilt stop 29 which is actually the floor between the inner 16 and outer 17 guides. The tilt stop 29 allows more tilt to the front and back than to the sides consistent with the natural neck range motion. The outer guide 17 also includes rotation stops 30, 31 which engage stops 33, [34] *99* on the movable member 18 to limit movement of the helmet to the left and right. The tilt stop 29 limits the back and forth motion of the helmet 10. Limiting both movements is crucial to prevent injury particularly in body contact sports such as football.

The outer helmet portion 13, as shown in FIG. 1, protects the neck from any force applied to the top of the helmet 10. The clearance between the inner and outer helmet portions 13 and 14 is greater than the compression of the shoulder pads 28. Thus any force applied to the top of the head is dissipated through the neck mechanism to the shoulder pads 28.

To use the helmet 10, the wearer puts on the shoulder pads 28 and then places the inner guide 16, movable inner member 18 and outer guide 17 about his neck and latches the ends of each member together. The helmet portions 13 and 14 are put on together and the outer helmet 13 is connected to the arms 19a and 19b by members 36a and 36b and 37a and 37b.

The helmet 10 by limiting the motion of the head in all directions helps prevent sports injuries. The helmet 10 is economical and practical without the limitations or drawbacks of the prior art. The neck mechanism 11 and helmet 10 are easy to use and do not meaningfully restrict the player during a game.

While the above described embodiments are shown to illustrate typical embodiments of the invention, numerous other embodiments may be conceived without departing from the spirit and scope of the invention.

What is claimed:

1. A helmet and shoulder pad combination having an aperture for the wearer's head to prevent injuries by limiting the movement of the wear's head comprising:

an inner helmet portion positioned over the wearer's head, an outer helmet portion resiliently mounted to the inner helmet portion, and, a neck assembly coupled to the outer helmet at one end to permit but limit the movement of the helmet in all directions, said assembly being mounted on the shoulder pads at the other end to dissipate any impacts, the neck assembly comprising an inner [cylindrical] guide *being substantially a hollow spherical section*, a movable inner member concentrically mounted about the inner guide and coupled to the helmet and an outer guide concentrically mounted about the movable member having predetermined stops to limit the movement of the helmet and wherein:

the inner guide, the movable member and the outer guide [are] all [substantially cylindrical] *being substantially hollow spherical sections* with openings at both ends and each includes a hinge along one wall and a latch at the opposite wall to permit opening and attachment about the wearer's neck.

2. A helmet and shoulder pad combination having an aperture for the wearer's head, to prevent injuries by limiting the movement of the wear's head comprising:

an inner helmet portion positioned over the wearer's head, an outer helmet portion resiliently mounted to the inner helmet portion, and, a neck assembly coupled to the outer helmet at one end to permit but limit the movement of the helmet in all directions, said assembly being mounted on the shoulder pads at the other end to dissipate any impacts, the neck assembly comprising an inner [cylindrical] guide *being substantially a hollow spherical section*, a movable inner member concentrically mounted about the inner guide and coupled to the helmet and an outer guide concentrically mounted about the movable member having predetermined stops to limit the movement of the helmet and wherein:

the movable member includes stops projecting outwardly from the outer portion thereof on each side and the outer guide includes projecting stops on the upper portion thereof to engage the stops on the movable member to limit the movement of the helmet to the left or right, and in inwardly protruding circumferential tilt stop engaging in movable member to limit the movement of the helmet up and down.

3. A helmet and shoulder pad combination having an aperture for the wearer's head, to prevent injuries by limiting the movement of the wear's head comprising:

an inner helmet portion positioned over the wearer's head, an outer helmet portion resiliently mounted to the inner helmet portion, and, a neck assembly coupled to the outer helmet at one end to permit but limit the movement of the helmet in all directions, said assembly being mounted on the shoulder pads at the other end to dissipate any impacts, the neck assembly comprising an inner [cylindrical] guide *being substantially a hollow spherical section*, a movable inner member concentrically mounted about the inner guide and coupled to the helmet and an outer guide concentrically mounted about the movable member having predetermined stops to limit the movement of the helmet and wherein:

the movable inner member includes an upwardly projecting arm on each side of the helmet, said arms each including an inner notch with a perpendicular upper surface and a downwardly angled lower surface and an inwardly protruding bar, and, the helmet includes apertures to engage the notches and bars coupling said helmet to the neck assembly.

* * * * *